UNITED STATES PATENT OFFICE.

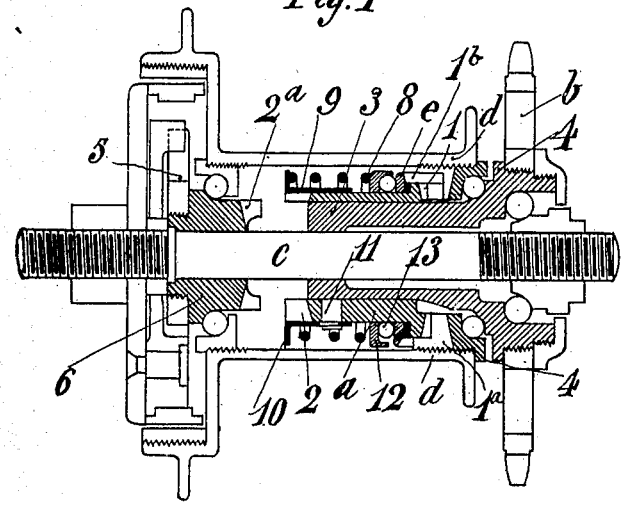

EDOUARD LOUIS HOCQUART, OF PARIS, FRANCE.

CYCLE-WHEEL GEAR WITH MEANS FOR OPERATING THE BRAKE BY BACK-PEDALING.

No. 892,154.

Specification of Letters Patent.

Patented June 30, 1908.

Application filed November 2, 1907. Serial No. 400,364.

*To all whom it may concern:*

Be it known that I, EDOUARD LOUIS HOCQUART, a citizen of the Republic of France, residing in Paris, in the Republic of France, engineer, have invented certain new and useful Improvements in Cycle-Wheel Gear with Means for Operating the Brake by Back-Pedaling, for which application has been made in France, May 11, 1907, No. 377,701; Germany, January 5, 1907.

This invention consists of an improved gear located in the hub of a driving wheel, for instance, a bicycle wheel, said gear being governed automatically by the manipulation of the pedals in order to obtain as desired either the rotation of the driving wheel or the operation of a brake by back pedaling, or finally the complete freeing of the driving wheel by the pedals being rendered stationary.

In the accompanying drawings to which reference will be made in the specification hereinafter set forth:—Figure 1 is a longitudinal section of a hub provided with gearing in the position for forward running; Fig. 2 represents the development of the teeth or claws of the gearing for demonstrating the working of the gear; Figs. 3 and 4 show, respectively, the same parts as in Figs. 1 and 2, in the position of free-wheeling or braking.

In these figures the same reference letters indicate the same parts.

*a* indicates the movable member of the gear which is provided at its extremities with gear teeth or projections 1, 2, and it is mounted with slight friction on a socket or bush 3 attached to the back sprocket wheel *b* and surrounding the axle *c* of the wheel. The mounting must be such that the part *a* although always capable of being displaced longitudinally on the socket or bush 3 always participates in the rotary movements of this latter, itself actuated by the pedals in the ordinary way. The teeth or projections 1 of the movable part *a* of the gearing enter into contact with the teeth $1^a$ carried by a part 4 firmly attached to the hub *d* surrounding the mechanism, in order to carry this hub with them and consequently the driving wheel. The teeth 2 of this same part *a* enter on the contrary into connection with teeth $2^a$ carried by a collar 6, in order to operate in any suitable manner a lever 5 the angular displacement of which causes the application of the brake. The gearings 1, $1^a$ and 2, $2^a$ are operated automatically by the manipulation of the pedals either forward or backward (back pedaling), which manipulation causes the rotation of the sprocket wheel *b*, and consequently of the movable member *a* in one direction or the other.

According to the direction of rotation of the movable member *a* owing to the form given to the teeth of the two gearings, there is automatically produced a longitudinal displacement of said member *a*, which must insure the thorough engagement of one of its two series of teeth 1 or 2 with its counter part $1^a$ or $2^a$. Then when this engagement has taken place and the rotation of the part *a* continues in the same direction, there is obtained either a rotation of the hub *d*, if it is the teeth 1 and $1^a$ which are in engagement, or the application of the brake if, on the contrary, it is the teeth 2 and $2^a$ which are in contact.

The essential and characteristic part of the gearing consists in the means employed for insuring the working of the gearing hereinbefore described without the teeth 1 and 2 of the movable part *a* being ever able to become jammed or gripped between the teeth $1^a$ and $2^a$, such an accident necessarily involving injury to the gearing. It is in fact evident that in order to obtain the automatic working of a gearing such as the one hereinbefore described, it is indispensable that the distance between the points of the teeth $1^a$, $2^a$, shall be less than the distance between the points of the teeth 1 and 2. If it were otherwise the movable part *a* might come out of contact with the teeth $1^a$ and $2^a$ which would involve its compulsory immobilization in a longitudinal direction. If however the total length of the part *a* were greater than the space left entirely free between the teeth $1^a$ and $2^a$, there would be reason to fear the gripping or jamming of this part *a* between the said teeth $1^a$ and $2^a$, particularly if one of the rings of teeth could move backward as is the case with the teeth $1^a$, which are firmly connected with the driving wheel. The device represented in the drawings does not exhibit this inconvenience.

In this system the teeth 2 and $2^a$ are of such a height that they cannot come into engagement as long as the opposite teeth 1 and $1^a$ remain in contact, and there exists also between their extremities suitable play when this contact has ceased. Under these conditions there is no longer any necessity to fear a jamming of the member *a* between the teeth 1ᵃ and 2ᵃ, but as the length of this part *a* is then less than the distance between the teeth the working of the system is no longer insured. In order to insure this working under the conditions which have just been indicated, the gearing is provided with a supplementary and intermediate part *e* adapted to turn with slight friction on its support, which piece *e* has teeth 1ᵇ identical with the ones 1 with which it may exactly fit, but of a greater height, this height must be sufficient to allow the teeth 1ᵃ of the part 4 to partially cover them when the opposite teeth 2 and 2ᵃ are still in contact.

Evidently the supplementary piece *e* provided with teeth 1ᵇ may give rise to numerous modifications; in the drawings it is shown, as an example, as having a dished form mounted around and on the part *a*. This dish is strongly pressed against its support by a spring 8 surrounding a bush or socket 9 also mounted on the part *a* and having a heel piece 10 against which the said spring 8 bears. The socket 9 is maintained in position by a nipple 11 fixed in the part *a*, the head of which is engaged in a slot formed in the said socket.

The internal diameter of the dish *e* is greater than the diameter of the end of the part 4, which allows the teeth 1ᵇ to engage above this latter, the teeth 1ᵃ of which project towards the exterior so as to encounter the said teeth 1ᵇ as shown in Fig. 1.

It is easily apparent that with such a system it is always certain that the part *a* will be properly engaged either against the part 4 or against the part 6 according to its direction of rotation. The piece *a* turning in fact by means of back pedaling in order to actuate the part 6, that is to say the brake, the gearing 2, 2ᵃ, operates normally and the parts of the system occupy the position shown respectively in Figs. 3 and 4. If, on the contrary, the part *a* be caused to turn in the reverse direction for the purpose of forward running, this part *a* is pushed towards the right by the teeth 2, 2ᵃ, the teeth 1ᵃ then enter into contact with the teeth 1ᵇ of the part *e* and force the part *a* to continue its displacement towards the right. The rotary motion of the part *a* continuing, the teeth 1 come in turn into contact with their counter part 1ᵃ, which sets the hub *d* (Figs. 1 and 2) in motion. The part *a* turning again in the rear direction, (back pedaling) the teeth 1ᵃ act on the teeth 1 and the teeth 1ᵇ push it to the left until the teeth 2, 2ᵃ, are in engagement and so forth.

If it be supposed that at a given moment the teeth 1ᵃ turn in the wrong direction drawn by the hub *d*, that is to say backwards, and that they engage the teeth 1ᵇ of the part *e*, one of two results may arise, namely, first the part *a* will come between the extreme parts 4 and 6 and nothing particular will happen, the part *a* being able to share in the rotary movement of the hub *d*; or secondly the part *a* will occupy such a position that the teeth 2 and 2ᵃ are in engagement. In this case the part *a* will be rendered stationary, but then the teeth 1ᵃ will exert on the teeth 1ᵇ a strain which will overcome the resistance offered by the ring *e*, which will then slip on its support part *a* without any member being injured by this abnormal friction. Evidently after such an operation the teeth 1ᵇ might not exactly cover the teeth 1, but this covering will be automatically produced when for running forward the member *a* sets into engagement the teeth 1ᵇ with the teeth 1ᵃ, and then the teeth 1 and 1ᵃ as hereinbefore explained. One form of friction brake in the interior of the hub *d* is shown in the drawings, but it is quite evident that this application is only given as an example, as the lever 5 might operate any other suitable system of brake.

It may be pointed out that the spring 8 gives the system a certain elasticity preventing any damage. It may bear on the part *e* with or without the intermediary of a ball bearing. Fig. 1 shows the first form; the spring 8 acting on a cup 12 containing the balls 13 which transmit the pressure to the part *e*.

I declare that what I claim is:—

1. In a driving and brake gear for wheels of cycles and the like, an operating member, wheel- and brake-actuating devices, a transmitting member located between said devices and mounted to rotate with said operating member and to move axially relative thereto, engaging and disengaging means on said devices and on each end of said transmitting member, the means on said transmitting member being a smaller distance apart than the means on said devices, and means, carried by said transmitting member, for bridging over the space between the said means on one end of said transmitting member and the corresponding means on one of said actuating devices.

2. In a driving and brake gear for wheels of cycles and the like, an operating member, wheel- and brake-actuating devices, a transmitting member located between said devices and mounted to rotate with said operating member and to move axially relative thereto, combined engaging and disengaging means on said devices and on each end of said transmitting member, the means on said member being located a smaller distance apart than the means on said devices, a further member frictionally connected with and carried by said transmitting member, combined engaging and disengaging means on said further member and means coacting with the said means on said further member for bridging over the space between the said means on one end of said transmitting member and the corresponding means on one of said actuating devices.

3. In a driving and brake gear for wheels of cycles and the like, an operating member, wheel- and brake-actuating devices, a transmitting member located between said devices and mounted to rotate with said operating member and to move axially relative thereto, a further member frictionally connected with said transmitting member, combined engaging and disengaging means on said devices, on each end of said transmitting member and on said further member, said means consisting of sets of projecting teeth each tooth of which has its two faces inclined in the same direction, the sets of teeth on the transmitting member being located a smaller distance apart than the sets of teeth on the actuating devices, and means being provided for normally projecting the teeth on said further member beyond the teeth on one end of said transmitting member.

4. In a driving and brake gear for wheels of cycles and the like, a chain wheel, a sleeve rigidly connected to said wheel, a transmitting member mounted on said sleeve so as to rotate therewith but to be capable of moving axially relative thereto, wheel- and brake-actuating devices located one on each side of said transmitting member, an annular member frictionally connected with said transmitting member, teeth having both faces inclined in the same direction, arranged in sets on said actuating devices, on each end of said transmitting member, and on said annular member, the sets of teeth on the two ends of the transmitting member being a smaller distance apart than the sets of teeth on the actuating devices, and spring means for normally projecting the teeth on said annular member beyond the teeth of said transmitting member.

In witness whereof, I have hereunto signed my name this 19th day of October, 1907, in the presence of two subscribing witnesses.

EDOUARD LOUIS HOCQUART.

Witnesses:
 ANTONIN MONTEILHET,
 DEAN B. MASON.